H. GIESELMAN.
HAY LOADER.
APPLICATION FILED SEPT. 10, 1915.
1,192,056.
Patented July 25, 1916.
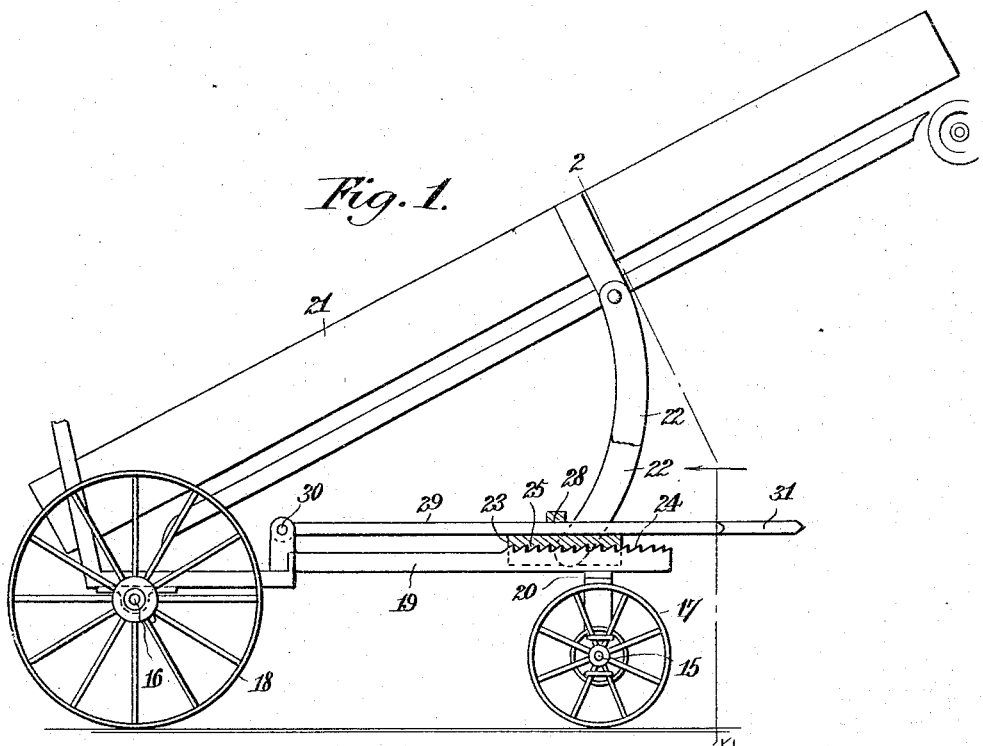
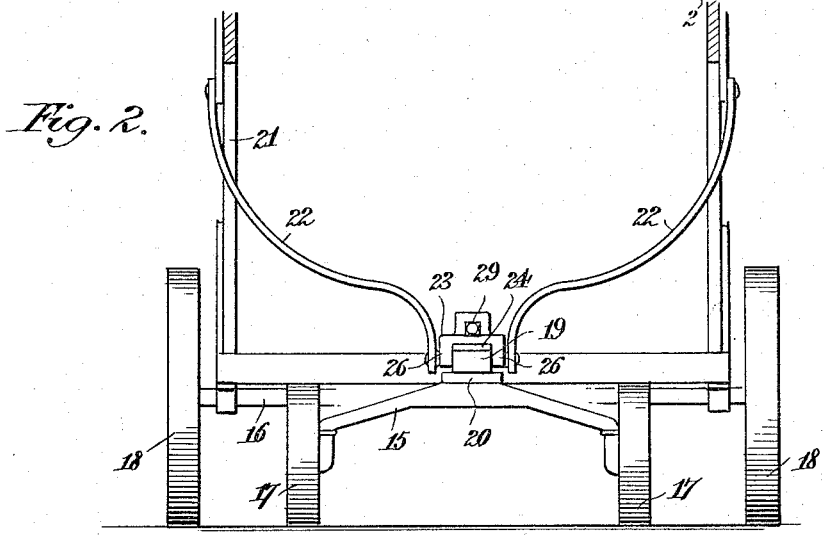
Inventor,
Henry Gieselman.
By Victor J. Evans,
Attorney.
Witnesses:

UNITED STATES PATENT OFFICE.

HENRY GIESELMAN, OF SYRACUSE, NEW YORK.

HAY-LOADER.

1,192,056.  Specification of Letters Patent.  Patented July 25, 1916.

Application filed September 10, 1915. Serial No. 50,029.

*To all whom it may concern:*

Be it known that I, HENRY GIESELMAN, a citizen of the United States, residing at Syracuse, in the county of Onondaga and State of New York, have invented new and useful Improvements in Hay-Loaders, of which the following is a specification.

This invention relates to that class of machines which are known as hay loaders, and it has particular reference to that type of hay loaders which are provided with means for gathering the hay from the windrows and conveying means for lifting or elevating the hay and depositing the same on a hay rack or wagon.

The present invention has for its object to produce a simple and improved construction whereby the conveying means may be adjusted so as to discharge or deliver the hay at various distances above the ground, thereby saving power, it being obvious that less power is required to elevate the hay to a point where it may be discharged into the bottom of the hay rack than is required to elevate the hay to a discharge point when a load has been built up on the rack.

A further object of the invention is to produce a simple and improved construction whereby the adjustment of the conveying device may be effected quickly and without necessarily interrupting the operation of the conveyer.

A further object of the invention is to simplify and improve the construction and arrangement and combination of parts constituting the improvement.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing, Figure 1 is a side elevation partly in section of a hay loader to which the invention has been applied. Fig. 2 is a transverse sectional view taken on the line 2—2 in Fig. 1.

Corresponding parts in both figures of the drawing are denoted by like characters of reference.

The front and rear axles 15 and 16 are supported by the wheels 17, 18. A reach bar 19 extends forwardly from the rear axle with which it is suitably connected, the forward end of said reach bar being supported with respect to the front axle by means including a fifth wheel 20 enabling the front truck to be turned for steering purposes.

The conveyer frame 21 is pivotally supported with respect to the rear axle 16, and said frame is connected by means of links 22 with a slide 23 which is longitudinally movable with respect to the reach bar 19. The latter is provided for a portion of its length with transversely disposed teeth or ratchets 24 which are engaged by corresponding teeth or ratchets 25 on the under face of the slide 23. The latter is provided with downwardly extending flanges 26 at the sides thereof, said flanges engaging the side faces of the reach bar so that the slide will be properly guided with respect to the latter. The slide 23 has an upwardly extending lug 27 provided with an aperture 28 for the passage of an arm or lever 29 fulcrumed at 30 near the rearward end of the reach bar, said lever having at its forward end a handle 31 whereby it may be manipulated.

In the operation of this device it will be seen that the conveyer frame through the links 22 exerts a downward strain on the slide 23, whereby the teeth of the latter are held in interlocking engagement with the teeth or ratchets 24 of the reach bar, thereby maintaining the parts in adjusted position. When a different adjustment of the conveyer frame is required the forward end of the lever 29 is lifted by means of the handle 31, thereby lifting the slide from the reach bar sufficiently to disengage the intermeshing teeth of the slide and reach bar. The slide may now be adjusted length-wise of the lever 29, thereby varying the angle of the links 22 with respect to the conveyer frame and raising or lowering the latter according to the direction in which the slide is moved. When the desired adjustment has been attained, the free end of the lever is lowered so as to restore the slide in engagement with the reach bar, causing the teeth 24, 25 to interlock and thereby securing the parts in adjusted position.

The improved device, as will be seen, is extremely simple in construction, and it may be readily installed on hay loaders of conventional form with the result of making the conveyers adjustable and enabling power to be economized in the operation of the machine.

Having thus described the invention, what is claimed as new, is:—

1. In a device of the class described, a wheel supported frame structure including front and rear axles and a reach bar, a conveyer frame pivoted on the rear axle, a slide member having depending flanges engaging the side faces of the reach bar, the opposed faces of said reach bar and slide member being provided with interengaging teeth, links connecting the slide member with the conveyer frame, and a lever fulcrumed on the reach bar and having slidable engagement with the slide member.

2. In a device of the class described, a wheel supported frame structure including front and rear axles and a reach bar, a conveyer frame pivoted on the rear axle, a slide member supported on the reach bar, the opposed faces of said slide member and the reach bar being provided with interengaging teeth, and said slide member being provided with an upwardly extending apertured lug, a lever fulcrumed on the reach bar and extending through the apertured lug which slidably engages said lever, and links connecting the slide member with the conveyer frame.

In testimony whereof I affix my signature in presence of two witnesses.

HENRY GIESELMAN.

Witnesses:
 HOWARD LAUN,
 EARL FRITTS.

Copies of this patent may be obtained for five cents each, by addressing the "Commissioner of Patents, Washington, D. C."